United States Patent
Houle et al.

(10) Patent No.: US 8,810,418 B2
(45) Date of Patent: Aug. 19, 2014

(54) VEHICLE FLUID REGULATOR VALVE DIAGNOSTIC SYSTEM

(71) Applicant: GM Global Technology Operations LLC, Detroit, MI (US)

(72) Inventors: Kevin P Houle, Flint, MI (US); Jean Marie Miller, Plymouth, MI (US); Valerie Zelko Byrd, Royal Oak, MI (US); Kathryn E Mulligan, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 13/688,300

(22) Filed: Nov. 29, 2012

(65) Prior Publication Data

US 2014/0145850 A1    May 29, 2014

(51) Int. Cl.
*G08B 21/00* (2006.01)
(52) U.S. Cl.
USPC ....... 340/606; 123/196 R; 184/26; 180/65.31; 180/65.29
(58) Field of Classification Search
USPC .......................... 340/606, 608, 609, 610, 611; 123/196 R; 184/14, 26, 29; 701/22; 180/65.21, 65.265, 65.275, 65.28, 180/65.285, 65.31, 65.4, 65.29
See application file for complete search history.

(56) References Cited

U.S. PATENT DOCUMENTS

| | | | |
|---|---|---|---|
| 7,055,486 B2 * | 6/2006 | Hoff et al. | 123/196 R |
| 7,395,803 B2 * | 7/2008 | Ledger et al. | 123/196 R |
| 8,649,925 B2 * | 2/2014 | Light et al. | 701/22 |

\* cited by examiner

*Primary Examiner* — Toan N Pham
(74) *Attorney, Agent, or Firm* — Quinn Law Group, PLLC

(57) ABSTRACT

A hybrid vehicle powertrain including a hybrid transmission in power-flow communication with an electric traction motor, a fluid pump, and a flow controller electrically connected to the fluid pump. The fluid pump is configured to supply fluid at an adjustable fluid flow rate to the hybrid transmission and the electric traction motor in response to a command from the flow controller. The flow controller is electrically connected to the fluid pump and configured to controllably modulate the operating speed of the fluid pump to adjust the fluid flow rate. If the difference between an expected rate of speed change of the fluid pump and the actual rate of speed change exceeds a threshold, the flow controller may limit the total amount of electrical power supplied to the electric traction motor.

15 Claims, 4 Drawing Sheets

VEHICLE FLUID REGULATOR VALVE DIAGNOSTIC SYSTEM

TECHNICAL FIELD

The present invention relates to systems and methods for identifying a stuck lubrication regulator solenoid valve by analyzing pump load response.

BACKGROUND

Within a vehicle powertrain, there can be many components that require continuous fluid lubrication to both reduce internal friction and cool the working components. If a fluid diverting valve becomes stuck or otherwise unable to selectively divert fluid flow to one or more fluid-requiring components, the starved components may be at an increased risk of overheating. In such circumstances, preventative measures may be taken to avoid resulting thermal or wear-based damage, however, systems must be available to facilitate early detection of the stuck condition.

SUMMARY

A hybrid vehicle powertrain includes a hybrid transmission in power-flow communication with an electric fraction motor, a fluid pump, and a flow controller. The fluid pump may be in fluid communication with a fluid reservoir and with the transmission and electric traction motor, and may be configured to supply fluid at an adjustable fluid flow rate to the hybrid transmission and the electric traction motor.

The flow controller may be electrically connected to the fluid pump and configured to controllably modulate the operating speed of the fluid pump to adjust the fluid flow rate. The flow controller may be further configured to: provide a speed command to the fluid pump that is greater than an operating speed of the pump; monitor a rate of change of the speed of the pump in response to the provided speed command; determine a difference between the monitored rate of change to an expected rate of change; and compare the difference to a threshold.

If the difference between the actual rate of change and the expected rate of change exceeds the threshold, the controller may be configured to limit the total amount of electrical power supplied to the electric traction motor. Alternatively, or in addition, the controller may be configured to provide an indicator if the difference exceeds the threshold, with the indicator being indicative of a nonresponsive regulator.

In one configuration, the flow controller is configured to receive an indication of an operating voltage and an operating current of the fluid pump. Using this indication, the flow controller may be configured to monitor an actual rate of change of the speed of the pump.

The flow controller may be configured to determine the expected rate of change of the fluid pump speed by selecting a value from a lookup table. The lookup table may be stored in the flow controller, and may express the expected rate of change as a function of a current pump speed, a commanded pump speed, and a fluid temperature.

Likewise, a method for determining the responsiveness of a selectively actuatable fluid regulator valve in communication with a variable speed fluid pump includes: providing a speed command to the fluid pump, the speed command being greater than an operating speed of the pump; monitoring a rate of change of the speed of the pump in response to the provided speed command; determining a difference between the monitored rate of change to an expected rate of change; comparing the difference to a threshold; and providing an indicator if the difference exceeds the threshold.

The above features and advantages and other features and advantages of the present invention are readily apparent from the following detailed description of the best modes for carrying out the invention when taken in connection with the accompanying drawings.

DETAILED DESCRIPTION

Figure 1:
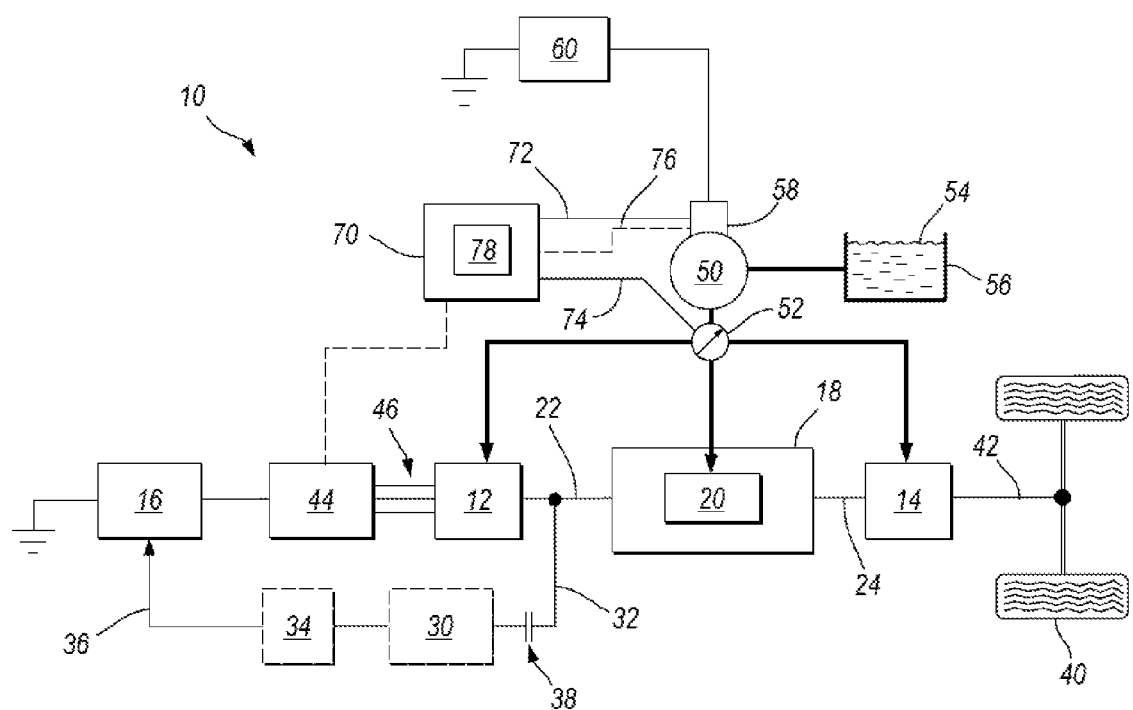
FIG. 1 is a schematic diagram of a hybrid electric vehicle including a fluid pump for supplying lubricating fluid to a plurality of components.

Referring to the drawings, wherein like reference numerals are used to identify like or identical components in the various views, FIG. 1 schematically illustrates a vehicle 10. In one configuration, the vehicle 10 may include a first traction motor 12, a second traction motor 14, and an energy storage system 16 (e.g., a battery 16). As such, the vehicle 10 may be configured as a hybrid electric vehicle (HEV), a battery electric vehicle (BEV), or an extended-range electric vehicle (EREV). Such vehicles can generate torque using one or both of the traction motors 12, 14 at levels suitable for propelling the vehicle in an electric-only (EV) mode.

In one configuration, the first and second traction motors 12, 14 may be in mechanical communication through a transmission 18. The transmission 18 may include one or more torque transmitting devices 20, such as gears, clutches, and/or brakes, that may selectively couple, either alone or in combination, a transmission input shaft 22 with a transmission output shaft 24. In one configuration, the transmission input shaft 22 may be selectively coupled with the first traction motor 12, and the transmission output shaft 24 may be selectively coupled with the second traction motor 14.

In some designs, an internal combustion engine 30, shown in phantom in FIG. 1, may be used to generate torque via an engine output shaft 32. Torque from the engine output shaft 32 can be used to either directly propel the vehicle 10, i.e., in an HEV design, or to power a generator 34, i.e., in an EREV design. The generator 34 can deliver electricity (arrow 36) to the battery 16 in a manner that may recharge the battery 16. A clutch and damping assembly 38 may be used to selectively connect/disconnect the engine 30 from a transmission 18. Torque may be ultimately transmitted from the first and/or second traction motors 12, 14, and/or the engine 30 to a set of drive wheels 40 via an output 42 of the second traction motor 14 (and/or the transmission 18 if the second motor 14 is omitted).

Each traction motor 12, 14 may be embodied as a fluid-cooled multi-phase permanent magnet/AC induction machine having a rotor and a stator, and rated for approximately 60 volts to approximately 300 volts or more. Each traction motor 12, 14 may be electrically connected to the battery 16 via a power inverter module (PIM) 44 and a high-voltage bus bar 46 (it should be noted that the schematic depiction of the high voltage bus bar extending to the second traction motor 14 has been omitted from FIG. 1 for clarity). The PIM 44 may generally be configured for converting DC power to AC power and vice versa as needed. The battery 16 may be selectively recharged using torque from the first traction motor 12 when that traction motor 12 is actively operating as a generator, e.g., by capturing energy during a regenerative braking event or when being driven by the internal combustion engine 30. In some embodiments, such as plug-in HEV (PHEV), the battery 16 can be recharged via an off-board power supply (not shown) when the vehicle 10 is idle.

During operation, the motors 12, 14 and various torque transmitting devices 20 of the transmission 18 may require an active flow of fluid lubrication to reduce friction and remove generated heat. This flow may be provided by an electrically-actuated/electric fluid pump 50 in fluid communication with the transmission 18, and/or each of the first and second traction motors 12, 14. As each component may have different fluid needs through operation, a selectively actuatable regulator valve 52 may be configured to modulate the flow from the sole pump 50 to the various devices 12, 14, 20.

The lubricating fluid 54 may be, for example, a petroleum-based or synthetic-based engine oil, a glycol-based coolant, or some other suitably viscous, friction-reducing fluid. Within the system, the lubricating fluid 54 may pass through one or more heat exchangers (not shown) configured to extract stored thermal energy. Likewise, a reserve supply of lubricating fluid may be maintained in a fluid reservoir 56 in fluid communication with the pump 50. The fluid reservoir 56 may further serve as a thermal expansion chamber to allow for a fully filled fluid circuit under all operating temperatures.

The fluid pump 50 may be driven by an electric motor 58 that may be energized either by an auxiliary battery 60 or a by separate DC-DC converter device (not shown) coupled with the primary battery 16. A flow controller 70 ("controller 70") may be electrically connected to the fluid pump 50, and may be configured to controllably modulate the operating speed of the electric motor 58 to thereby adjust the flow of the lubricating fluid 54 within the fluid circuit (i.e., to the transmission 18, and/or each of the first and second traction motors 12, 14). For example, the flow controller 70 may provide a speed control signal 72 to the electric motor 58 to command a desired pump speed. In one embodiment, the motor 58 may be a torque-controlled motor, whereby current supplied to the motor may be modulated in a closed-loop manner to achieve the speed commanded by the speed control signal 72.

The controller 70 may similarly be configured to electronically modulate the fluid diverting behavior of the regulator valve 52 via a valve control signal 74. In this manner, the controller 70 may selectively divert a variable amount of flow from the pump 50 to, for example, the traction motors 12, 14. Finally, the controller 70 may monitor a voltage and/or current drawn by the electric motor 58 (via a feedback signal 76), to estimate the actual functioning of the pump 50 and flow of the hydraulic fluid 54 through the system. In other embodiments, the feedback signal 76 may directly represent the speed of the pump, such as through an angular encoder output. In this manner, the controller 70 may sense and/or have knowledge of the real-time speed and torque of the pump motor.

The controller 70 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The controller 70 may regulate fluid flow in part by executing an algorithm 78 (i.e., a "flow control algorithm 78") that resides within the controller or is otherwise readily executable by the controller.

Figure 2:
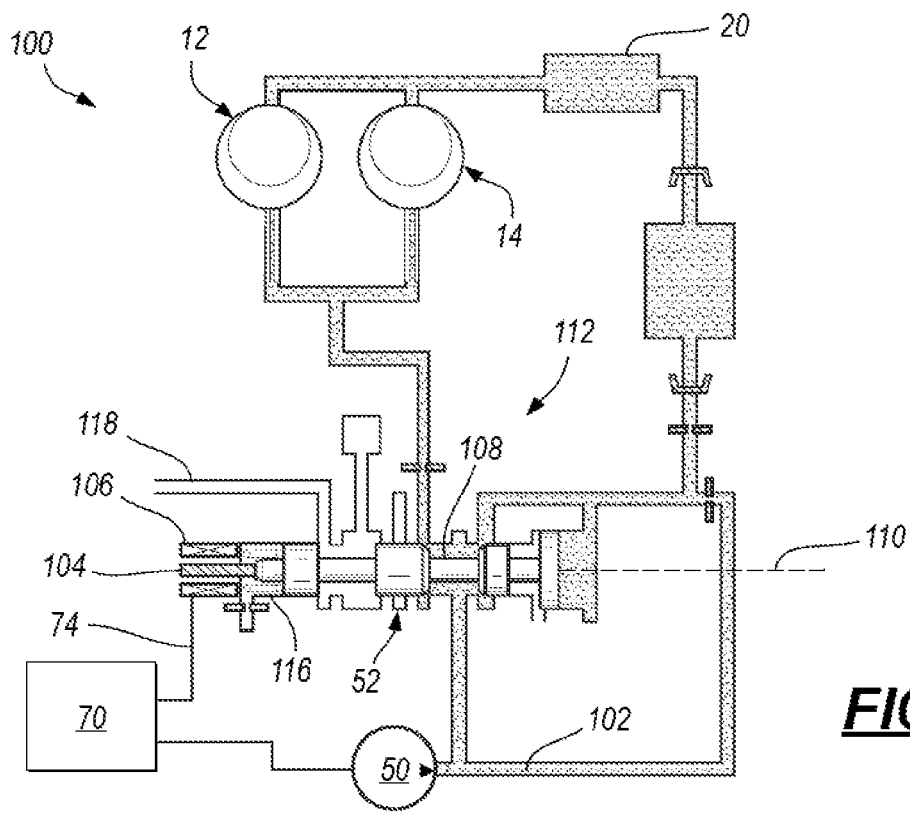
FIG. 2 is a schematic diagram of a selectively actuatable fluid regulator valve in a first position.
Figure 3:
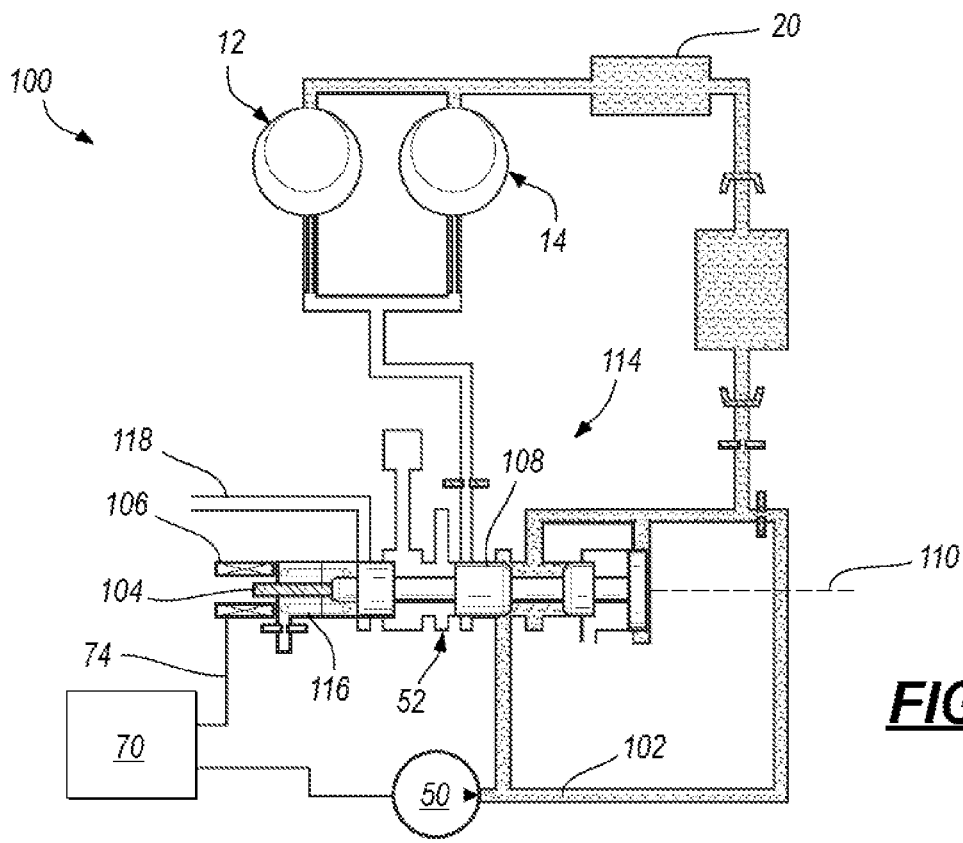
FIG. 3 is a schematic diagram of a selectively actuatable fluid regulator valve in a second position.

FIGS. 2 and 3 schematically illustrate an embodiment of the fluid circuit 100 consisting of a selectively actuatable regulator valve 52 configured to divert a fluid flow 102 from the fluid pump 50 to the first motor 12, the second motor 14, and the one or more torque transmitting devices 20 of the transmission 18. The selectively actuatable regulator valve 52 may be, for example, a solenoid actuated valve that includes an armature 104 configured to selectively translate within a stationary solenoid coil 106. Movement of the armature 104, via the solenoid 106, may be mechanically translated into a corresponding movement of a fluid-diverting shuttle 108 along a valve axis 110 between a first position 112 (shown in FIG. 2) and a second position 114 (shown in FIG. 3). Such movement may be in direct response to the application of the valve control signal 74.

The regulator valve 52 may further include a return spring 116 that is configured to reset the shuttle 108 to, for example, the first position 112 when current is removed (or applied) to the solenoid coil 106. The valve 52 may similarly rely on one or more back-pressure flows 118 to balance the pressure-forces on the shuttle 108 and allow the solenoid to effectively move the shuttle 118. In another configuration, the shuttle 108 may entirely move under the influence of the various fluid pressures.

As illustrated in FIGS. 2 and 3, when the shuttle 108 is in the first position 112, fluid 54 may flow to the torque transmitting devices 20, and separately to both the rotors and stators of the first and second motors 12, 14. Conversely, when the shuttle 108 is in the second position 114, fluid may solely flow to the torque transmitting devices 20 and rotors of the first and second motors 12, 14, however, the spool may obstruct flow of the fluid to the stators of the first and second motors 12, 14.

Under some operating conditions, it may be possible for the shuttle 108 to stick in the second position 114 (shown in FIG. 3) despite a counteracting force by the return spring 116. If the shuttle 108 were to become unresponsive in this manner, then regardless of the application of the control signal 74, fluid may be prevented from passing to the stators of the first and second motors 12, 14. In situations where adequate fluid flow is required to lubricate and/or cool the motors 12, 14, the occurrence of a stuck valve may result in increased wear, inaccurate thermal control, and/or thermal damage. Moreover, in situations where temperature sensors are not present on the motors 12, 14, thermal control/management be entirely based on an assumed heat capacity of the fluid and on an assumed flow rate of the fluid within the fluid circuit 100. If the system ceases to function properly, these inferential temperature estimates may be incorrect.

Therefore, in one configuration, the controller 70 may be configured to determine if the shuttle 108 is stuck by examining the response characteristics of the pump 50 to a commanded flow rate/speed. For example, the controller 70 may monitor the rate of change of the speed of the pump 50 for a given speed command. This rate of change may be largely dependent on the previous pump speed, new commanded speed, and any system back pressure against the pump 50. When the valve is stuck, the back pressure against the pump may rapidly increase without a similar increase in pump speed. Such an unexpected change in the system would then affect the motor control scheme and speed-control errors would then be detectable. Alternatively, in a torque-controlled motor, to achieve the desired speed command, the controller 70 may expect a certain amount of torque (current draw) to accelerate the pump, given the current operating conditions. If the operating conditions are contrary to what is expected (such as with a stuck valve), the required torque (current draw) may be considerably different than expected to achieve the desired speed response. By comparing the actual torque (current) to the expected torque (current), the controller may diagnose a valve fault.

Figure 4:
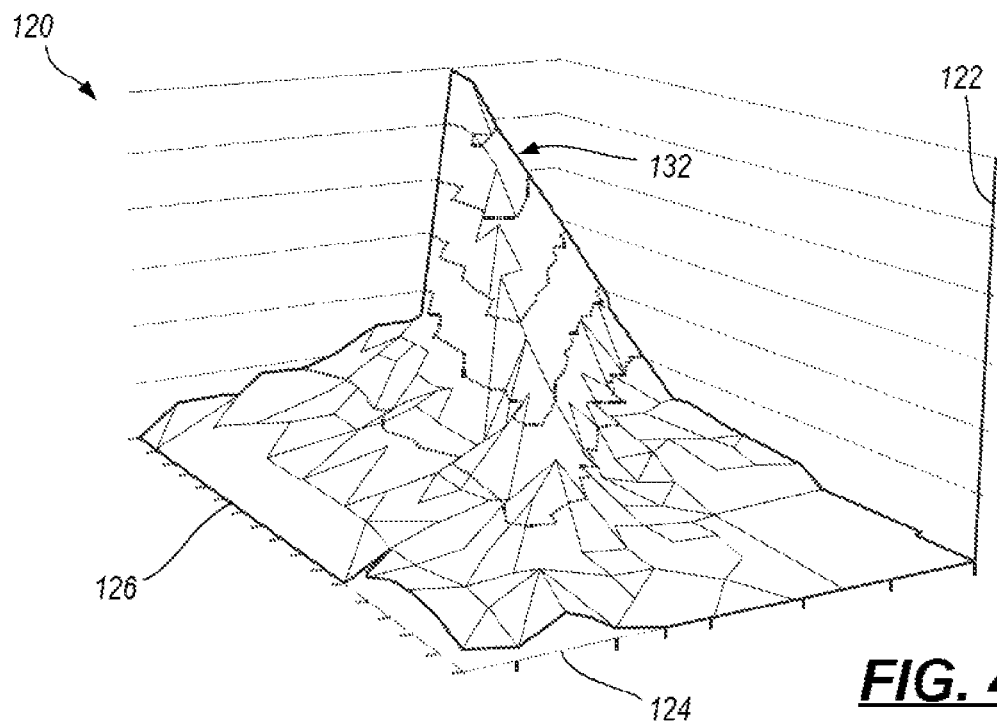
FIG. 4 is a schematic plot of an expected rate of change of a fluid pump speed for an operational regulator valve, shown as a function of a current pump speed and a commanded change in pump speed.
Figure 5:
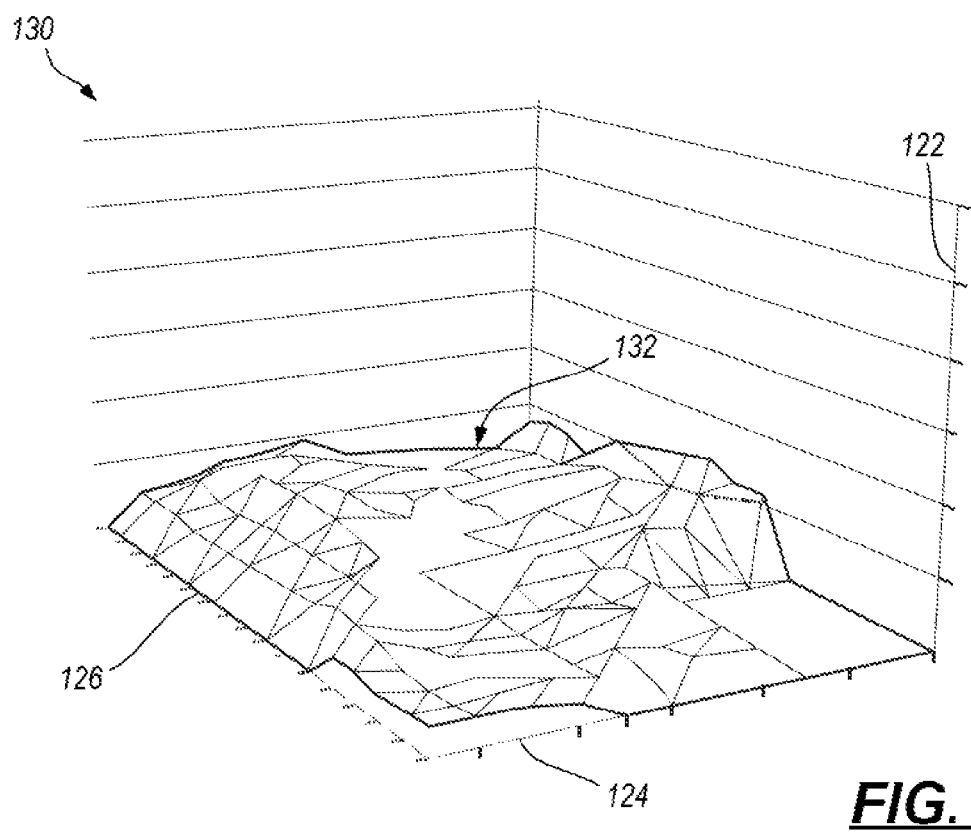
FIG. 5 is a schematic plot of an expected rate of change of a fluid pump speed for a non-operational regulator valve, shown as a function of a current pump speed and a commanded change in pump speed.

FIG. 4 illustrates a plot 120 of an expected speed-change response rate 122 for a functioning valve, as a function of the previous speed set point 124 and the fluid back pressure 126 on the pump. As understood, back pressure may be inferred by the applied torque on the pump motor. This plot 120 illustrates a range of operating parameters where the pump is highly responsive to the input signal. FIG. 5 then illustrates a second plot 130, similar to plot 120, which may be representative of the response rate in the presence of a stuck valve. As described above, because the valve prevents fluid flow from reaching the motors 12, 14, the pump 50 may not react as quickly (if at all) to the modified speed command. When compared with the plot in FIG. 4, the difference may be more pronounced at higher speed set points/pressure ranges (generally at 132). As such, testing at or near these operating conditions 132 may provide the most inside into the functionality/operational status of the system.

FIGS. 4 and 5 are illustrated for one particular operating temperature. The diagnostic methods described herein may evidence the greatest signal-to-noise ratio when the fluid temperature is near an ideal operating temperature (e.g., within a tolerance of an ideal operating temperature). In this manner, the viscosity of the fluid may have a minimized effect in the response of the pump. Likewise, it is desirable to perform this analysis while the vehicle powertrain is operating in a steady state mode. (e.g. when there is no shifting or accelerations occurring). The pump speed, temperature, and amount of transient behavior that result in the greatest pump response difference may be generally referred to as the "ideal testing conditions."

In one configuration the ideal testing conditions may typically be obtained when the vehicle is driving under steady state conditions with the hydraulic fluid within a tolerance of a stable operating temperature (i.e., the vehicle is at or near its steady-state operating temperature). The ideal testing conditions may be vehicle-dependant, and may numerically vary for each specific vehicle configuration.

While FIGS. 4 and 5 are illustrated with respect to a rate of change of pump speed, a similar analysis/comparison may be made with respect to pump torque/current draw. As mentioned above, for given operating conditions, the controller may estimate the required current to achieve a requested pump speed response. Such an estimation is often referred to as feed-forward control. Using closed-loop control techniques, the actual resulting pump speed may be fed back to the controller to be used in error rejecting control strategies. By comparing the closed-loop current supply to the purely feed-forward current supply, the controller 70 may infer the operational status of the fluid circuit 100 (i.e., by comparing the actual response to the expected response).

The controller 70 may store the plot 120 of the expected response 122 as a lookup table in memory associated with the controller 70. If predefined operating criteria are met (i.e., the vehicle is operating at or near the operating conditions at 132), the controller 70 may initiate the flow control algorithm to monitor a pump response to a commanded speed or torque increase. If the difference between the monitored response and the expected response is either negligible or below a predetermined threshold, the valve 52 may be diagnosed as fully operational. If however, the difference between the monitored response and the expected response exceeds the predetermined threshold, the controller 70 may indicate that the valve is stuck.

As described above, when there is a lack of fluid flow to the motors 12, 14, they may be at risk of overheating. In response to a "stuck" assessment, the controller 70 may provide an instruction to a motor controller and/or the PIM 44 to operate the motors 12, 14 in a substantially reduced capacity (i.e., limit the maximum amount of power that may be provided to the motors). In this manner, the risk of overheating and/or permanent damage may be greatly reduced.

Figure 6:
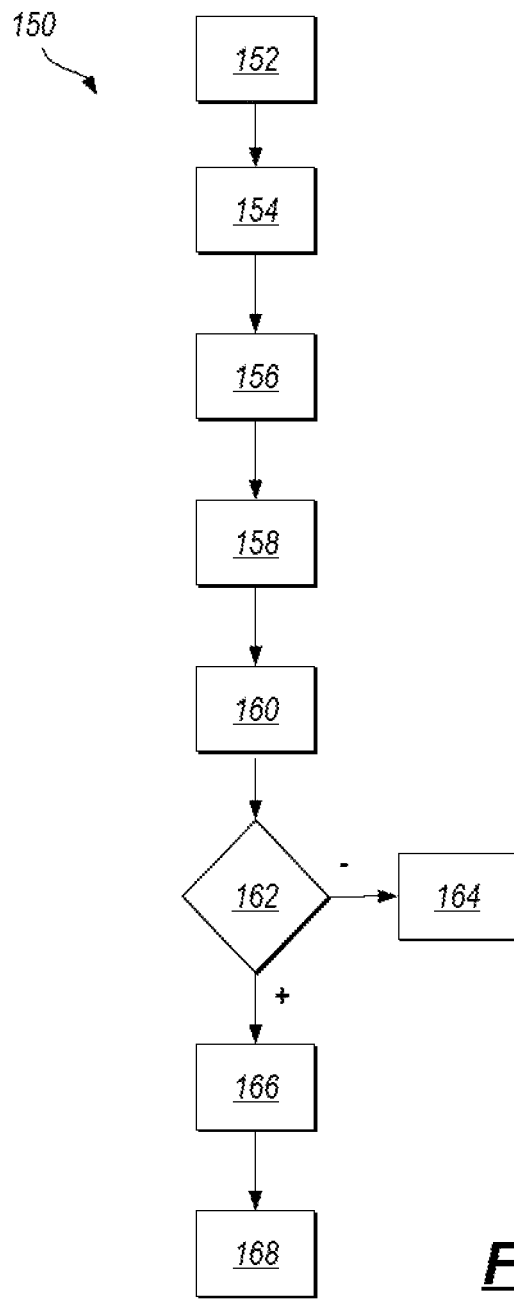
FIG. 6 is a schematic flow diagram of a method of determining the responsiveness of a selectively actuatable fluid regulator valve.

FIG. 6 illustrates a method 150 of monitoring a flow control valve configured to separately supply a lubricating fluid to each of a torque transmitting device 20 of a vehicle transmission 18, and to an electric motor of the vehicle. The method 150 may be embodied as an algorithm 78 being executed or performed by a controller 70. The method 150 may begin at step 152 when the controller 70 determines an opportunistic time to initiate the routine. As described above, such a time may be chosen when the vehicle is sufficiently warm, and is operating at consistent speeds/torques within a predetermined speed/torque range. At step 154, the controller 70 may command the pump 50 to perform an increase in speed through a speed control signal 72. Immediately thereafter, in step 156, the controller 70 may monitor the actual rate of change of pump speed or torque. Such monitoring may be performed, for example, through a speed sensor/encoder associated with the pump, or through electrical monitoring of the voltage and current being drawn by the pump (via a feedback signal 76).

In step 158, the controller 70 may select an expected rate of change of pump speed or torque from a lookup table stored in memory. This expected rate of change of pump speed or torque may be chosen, for example, using the previous pump speed or torque, commanded speed and temperature during these certain known drive conditions. In step 160, the controller 70 may compute the difference between the actual pump response and the expected pump response, and compare it to a threshold in step 162. If the difference is below the threshold, the controller 70 may indicate that the valve is likely operational (step 164). If the difference is above the threshold, however, the controller 70 may provide an instruction to a motor controller and/or the PIM 44 to operate the traction motors at a substantially reduced power capacity (step 166). In this manner, less electrical current may be supplied to the motor, which may inherently reduce the amount of heat generated through electrical resistance and/or mechanical friction. The controller 70 may also be configured to provide an indicator in step 168 if the difference exceeds the threshold, the indicator being indicative of a nonresponsive regulator valve. In this manner, the controller 70 may, for example, document the stuck condition in an on-board diagnostic (OBD) log associated with the controller 70. Using this log, a trained service technician may quickly diagnose the condition and perceived cause.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A hybrid vehicle powertrain comprising:
a hybrid transmission in power-flow communication with an electric traction motor; a fluid pump in fluid communication with a fluid reservoir and with the transmission and electric traction motor, the fluid pump configured to supply fluid at an adjustable fluid flow rate to the hybrid transmission and the electric traction motor; and
a flow controller electrically connected to the fluid pump and configured to controllably modulate an operating speed of the fluid pump to adjust the fluid flow rate, wherein the flow controller is configured to: provide a speed command to the fluid pump, the speed command being greater than an operating speed of the pump; monitor a rate of change of the speed of the pump in response to the provided speed command;
determine a difference between the monitored rate of change to an expected rate of change;
compare the difference to a threshold; and limit a total amount of electrical power supplied to the electric traction motor if the difference exceeds the threshold.

2. The hybrid vehicle powertrain of claim 1, wherein the flow controller is configured to receive an indication of an operating voltage and an operating current of the fluid pump; and
wherein the flow controller is configured to monitor a rate of change of the speed of the pump using the received indication of the operating voltage and operating current.

3. The hybrid vehicle powertrain of claim 1, wherein the flow controller includes a lookup table expressing an expected rate of change as a function of a current pump speed, a commanded pump speed, and a fluid temperature.

4. The hybrid vehicle powertrain of claim 1, wherein the flow controller is configured to provide an indicator if the difference exceeds the threshold; and
wherein the indicator is indicative of a nonresponsive regulator valve.

5. The hybrid vehicle powertrain of claim 4, wherein the indicator includes a diagnostic code stored within a electronic diagnostic log.

6. A method for determining a responsiveness of a selectively actuatable fluid regulator valve in communication with a variable speed fluid pump, the method comprising: providing a speed command to the fluid pump, the speed command being greater than an operating speed of the pump; monitoring a rate of change of the speed of the pump in response to the provided speed command; determining a difference between the monitored rate of change to an expected rate of change; comparing the difference to a threshold; providing an indicator if the difference exceeds the threshold; and wherein the indicator is indicative of a nonresponsive regulator valve.

7. The method of claim 6, wherein the fluid pump is in selective fluid communication with an electric traction motor through the fluid regulator valve; and the method further comprising limiting a total amount of electrical power supplied to the electric traction motor if the difference exceeds the threshold.

8. The method of claim 6, wherein the indicator includes a diagnostic code stored within an electronic diagnostic log.

9. The method of claim 6, wherein monitoring the rate of change of the speed of the pump includes:
sensing an operating voltage and an operating current of the fluid pump; and
determining a rate of change of the speed of the pump using the sensed operating voltage and operating current.

10. The method of claim 6, wherein determining a difference between the monitored rate of change to an expected rate of change includes determining an expected rate of change of the fluid pump speed.

11. The method of claim 10, wherein determining an expected rate of change of the fluid pump speed includes selecting an expected rate of change value from a lookup table; and
wherein the lookup table expresses the expected rate of change as a function of a current pump speed, a commanded pump speed, and a fluid temperature.

12. A hybrid vehicle powertrain comprising:
a hybrid transmission in power-flow communication with an electric traction motor; a fluid pump in fluid communication with a fluid reservoir and with the transmission and electric traction motor, the fluid pump configured to supply fluid at an adjustable fluid flow rate to the hybrid transmission and the electric traction motor; and a flow controller electrically connected to the fluid pump and configured to controllably modulate an operating speed of the fluid pump to adjust the fluid flow rate, wherein the flow controller is configured to:
provide a speed command to the fluid pump, the speed command being greater than an operating speed of the pump; monitor a current draw of the pump to the provided speed command; determine a difference between the monitored current draw and an expected current draw; compare the difference to a threshold; provide an indicator if the difference exceeds the threshold; and wherein the indicator is indicative of a nonresponsive regulator valve.

13. The hybrid vehicle powertrain of claim 12, wherein the flow controller is further configured to limit a total amount of electrical power supplied to the electric traction motor if the difference exceeds the threshold.

14. The hybrid vehicle powertrain of claim 12, wherein the flow controller includes a lookup table expressing the expected current draw as a function of a current pump speed, a commanded pump speed, and a fluid temperature.

15. The hybrid vehicle powertrain of claim 12, wherein the indicator includes a diagnostic code stored within an electronic diagnostic log.

* * * * *